(12) United States Patent
Akiyama et al.

(10) Patent No.: US 8,503,265 B2
(45) Date of Patent: Aug. 6, 2013

(54) OBSTACLE DETECTION APPARATUS AND METHOD FOR DETECTING OBSTACLE

(75) Inventors: Keiko Akiyama, Kariya (JP); Mitsuyasu Matsuura, Chiryu (JP); Hisanaga Matsuoka, Okazaki (JP); Yasuyuki Okuda, Aichi-gun (JP); Hiromi Ariyoshi, Kariya (JP)

(73) Assignees: Nippon Soken, Inc., Nishio (JP); Denso Corporation, Kariya (JP)

(*) Notice: Subject to any disclaimer, the term of this patent is extended or adjusted under 35 U.S.C. 154(b) by 377 days.

(21) Appl. No.: 12/656,524

(22) Filed: Feb. 2, 2010

(65) Prior Publication Data

US 2010/0220550 A1 Sep. 2, 2010

(30) Foreign Application Priority Data

Feb. 27, 2009 (JP) .................................. 2009-45803

(51) Int. Cl.
*G01S 15/00* (2006.01)
*G01S 13/00* (2006.01)
*G01S 7/40* (2006.01)
*G08G 1/16* (2006.01)
*G08G 1/01* (2006.01)
*B60Q 1/00* (2006.01)
*G08B 1/08* (2006.01)
*G05D 1/02* (2006.01)

(52) U.S. Cl.
USPC ............... 367/93; 367/99; 340/903; 340/435; 340/933; 340/441; 340/539.13; 701/300; 342/70; 342/174

(58) Field of Classification Search
USPC ........... 340/566, 565, 436, 435, 407.2, 407.1, 340/979, 977, 973, 433, 903, 901, 539.13, 340/573.4, 539.32; 367/903, 908, 99, 100–101, 367/135, 138, 901, 93; 342/70, 71, 90, 99, 342/118, 123, 128, 146, 159; 701/300, 301, 701/41
See application file for complete search history.

(56) References Cited

U.S. PATENT DOCUMENTS 5,574,426 A * 11/1996 Shisgal et al. ................ 340/435
5,627,511 A * 5/1997 Takagi et al. ................. 340/435
(Continued)

FOREIGN PATENT DOCUMENTS

EP 1764630 A1 3/2007
JP A-07-092263 4/1995
(Continued)

OTHER PUBLICATIONS

Office action mailed on Feb. 15, 2011 from JPO in the corresponding Japanese Patent Application No. 2009-045803 (English translation enclosed).

*Primary Examiner* — Jennifer Mehmood
*Assistant Examiner* — Mirza Alam
(74) *Attorney, Agent, or Firm* — Posz Law Group, PLC

(57) ABSTRACT

A transmission and reception device is located at a predetermined height on a movable object and directed toward an outside. The transmission and reception device includes a transmission unit for repeatedly transmitting sensing waves at a predetermined interval and a reception unit for receiving reflective waves of the sensing waves from a detected object. A peak value detecting unit detects peak values of the received reflective waves and stores the detected peak values. A difference arithmetic unit calculates a difference in the detected peak values with movement of the movable object closer to the detected object. An object determination unit determines the detected object to be a near-road-surface obstacle, which is close to a road surface, when the difference is a negative value. The object determination unit determines the detected object to be an other obstacle than the near-road-surface obstacle when the difference is a positive value.

20 Claims, 14 Drawing Sheets

U.S. PATENT DOCUMENTS

| | | | |
|---|---|---|---|
| 6,018,308 A * | 1/2000 | Shirai | 342/70 |
| 6,087,975 A | 7/2000 | Sugimoto et al. | |
| 6,429,804 B1 | 8/2002 | Kishida et al. | |
| 7,348,876 B2 * | 3/2008 | Kato et al. | 340/435 |
| 2003/0080877 A1 * | 5/2003 | Takagi et al. | 340/932.2 |
| 2005/0024261 A1 * | 2/2005 | Fujita | 342/174 |
| 2005/0041819 A1 * | 2/2005 | Brown | 381/86 |
| 2005/0212672 A1 * | 9/2005 | Fry | 340/539.13 |
| 2007/0291590 A1 * | 12/2007 | Harada et al. | 367/99 |
| 2008/0122604 A1 * | 5/2008 | Hattori et al. | 340/441 |

FOREIGN PATENT DOCUMENTS

| | | |
|---|---|---|
| JP | A-08-021714 | 1/1996 |
| JP | A-09-288178 | 11/1997 |
| JP | A-2000-338225 | 12/2000 |
| JP | A-2002-156233 | 5/2002 |
| JP | A-2006-343309 | 12/2006 |
| JP | A-2008-032499 | 2/2008 |

* cited by examiner

FIG. 9

| NOTIFICATION PATTERN | POLE, WALL | WHEEL STOPPER, CURBSTONE |
|---|---|---|
| 1 | HIGH TONE | LOW TONE |
| 2 | LOUD SOUND | SOFT SOUND |
| 3 | BEEP, BEEP, BEEP | BLIP, BLIP, BLIP |
| 4 | "THERE IS OBSTACLE" | "THERE IS OBSTACLE DOWNWARD" |

OBSTACLE DETECTION APPARATUS AND METHOD FOR DETECTING OBSTACLE

CROSS REFERENCE TO RELATED APPLICATIONS

This application is based on and incorporates herein by reference Japanese Patent Application No. 2009-45803 filed on Feb. 27, 2009.

FIELD OF THE INVENTION

The present invention relates to an obstacle detection apparatus for detecting an obstacle in a movable direction of a movable object. The present invention relates to a method for detecting an obstacle.

BACKGROUND OF THE INVENTION

When a vehicle (movable object) is parked in a garage, a parking lot, or the like, it is necessary to recognize a kind of an obstacle, such as a wheel stopper, a pole, or a wall, for appropriately park the vehicle. In particular, when a vehicle is parked by moving the vehicle to a parking space backward, recognition of a kind of an obstacle is significantly important. In such a case, when a driver forgets to confirm whether a wheel stopper is located in a parking space in advance, it is hard to park the vehicle appropriately. In addition, a wheel stopper, which is low in height from a road surface, is hard to be directly and visually confirmed. For example, JP-A-2006-343309 discloses a technology related to an obstacle detection apparatus. The obstacle detection apparatus disclosed in JP-A-2006-343309 includes elements arranged in an array form for transmitting a wave and receiving a reflective wave from an obstacle. Specifically, the obstacle detection apparatus calculates a distance from an obstacle in accordance with a time lag between a time point, at which transmission of a wave starts, and a time point, at which a reflective wave is received, and calculates a direction toward an obstacle in accordance with a phase difference in each received signal. In this manner, the obstacle detection apparatus specifies a position of an obstacle and determines a kind of an obstacle such as a wheel stopper, a pole a wall, or another object.

Further, JP-A-07-92263 discloses an obstacle detection apparatus configured to emit an ultrasonic wave in a beam form downward in order to detect a wheel stopper. Specifically, the obstacle detection apparatus determines existence of a wheel stopper by detecting change in a receiving time when receiving a reflective wave from a wheel stopper, which is higher than a road surface, in a state of receiving a reflective wave from a road surface. It is noted that the obstacle detection apparatus of JP-A-2006-343309 includes multiple elements in an array form for recognizing a kind of an object and is expensive. Further, the obstacle detection apparatus of JP-A-07-92263 detects an obstacle such as a wheel stopper with low height from a road surface. Accordingly, another device needs to be separately provided for detection of an object with high height, such as a pole, a wall other than a wheel stopper. In addition, the obstacle detection apparatus is configured to detect an obstacle located closely downward. Accordingly, recognition of an obstacle may be delayed.

SUMMARY OF THE INVENTION

In view of the above and other problems, it is an object of the present invention to produce an obstacle detection apparatus having a simple and inexpensive structure and configured to distinguish between a high obstacle, such as a pole and a wall, and a low obstacle, such as a wheel stopper, without closely approaching to an obstacle. It is another object of the present invention to produce a method for detecting an obstacle.

According to one aspect of the present invention, an obstacle detection apparatus comprises a transmission and reception device located at a predetermined height on a movable object and directed toward an outside, the transmission and reception device including i) a transmission unit configured to repeatedly transmit sensing waves at a predetermined interval and ii) a reception unit configured to receive reflective waves of the sensing waves from a detected object in a detection area. The obstacle detection apparatus further comprises a peak value detecting unit configured to detect peak values of the reflective waves received by the reception unit and configured to store the detected peak values. The obstacle detection apparatus further comprises a difference arithmetic unit configured to calculate a difference in the peak values detected by the peak value detecting unit with movement of the movable object closer to the detected object. The obstacle detection apparatus further comprises an object determination unit configured to i) determine a kind of the detected object to be a near-road-surface obstacle, which exists at a position close to a road surface, when the difference in the peak values calculated by the difference arithmetic unit is a negative value, and ii) determine the kind of the detected object to be an other obstacle, which exists at a position higher than the position close to the road surface, when the difference in the peak values calculated by the difference arithmetic unit is a positive value.

A method for detecting an obstacle, the method comprises repeatedly transmitting sensing waves at a predetermined interval from a predetermined height on a movable object toward an outside of the movable object. The method further comprises receiving reflective waves of the sensing waves at the predetermined height on the movable object from a detected object in a detection area. The method further comprises detecting peak values of the received reflective waves. The method further comprises storing the detected peak values. The method further comprises calculating a difference in the stored detected peak values with movement of the movable object closer to the detected object. The method further comprises determining a kind the detected object to be a near-road-surface obstacle, which exists at a position close to a road surface, when the calculated difference in the peak values is a negative value. The method further comprises determining the kind of the detected object to be an other obstacle, which exists at a position higher than the position close to the road surface, when the calculated difference in the peak values is a positive value.

BRIEF DESCRIPTION OF THE DRAWINGS

The above and other objects, features and advantages of the present invention will become more apparent from the following detailed description made with reference to the accompanying drawings. In the drawings:

FIG. 9 is a table showing notification patterns;

DETAILED DESCRIPTION OF PREFERRED EMBODIMENTS

First Embodiment

Figure 1:
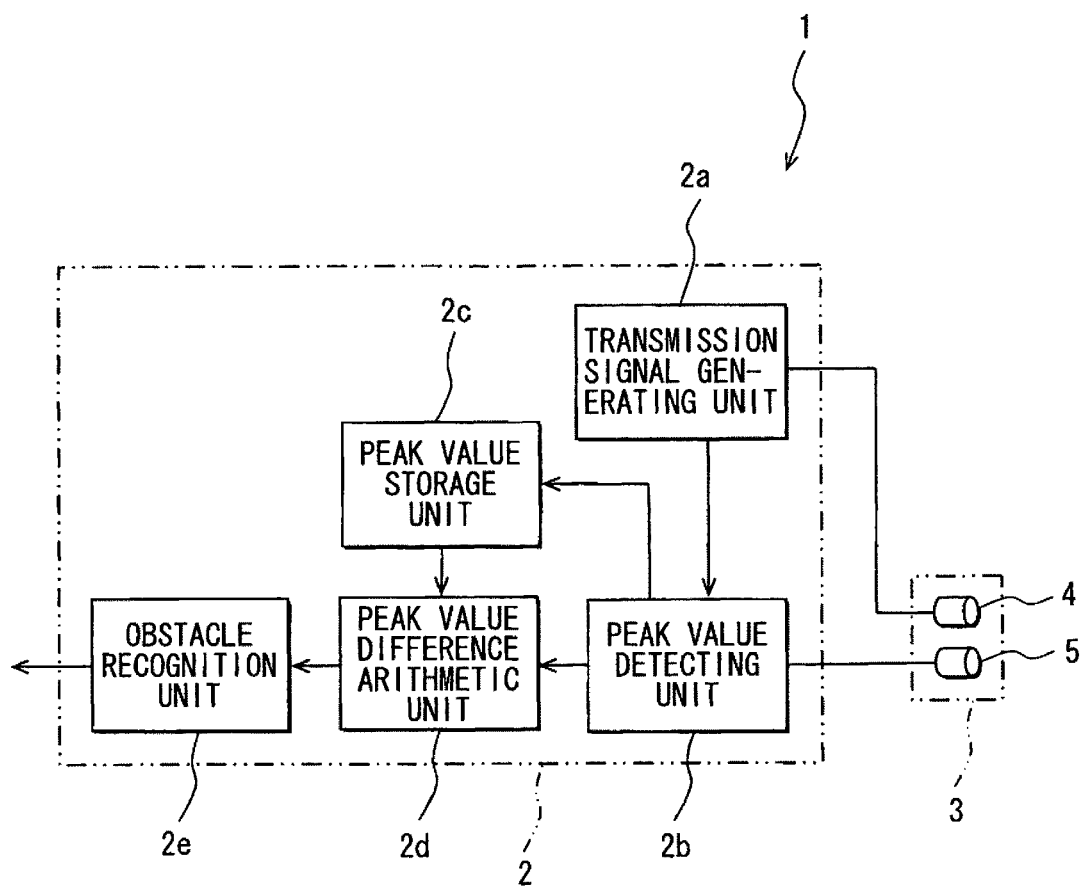
FIG. 1 is a block diagram showing an obstacle detection apparatus according to a first embodiment.

As follows, the present embodiment will be described with reference to FIGS. 1 to 5. FIG. 1 is a block diagram showing an electric connection of an obstacle detection apparatus 1, which includes an electronic control unit (ECU) 2 and a transmission and reception device 3. The ECU 2 mainly includes a control unit such as a microcomputer having a processing function. The ECU 2 further includes a storage circuit such as a ROM, a RAM, and/or a nonvolatile memory and an interface unit via which various kinds of data and the like are transmitted. The storage circuit prestores an obstacle recognition program.

As shown in FIG. 1, the ECU 2 has functional blocks for constituting an obstacle recognition program function. The ECU 2 includes functional blocks of a transmission signal generating unit 2a, a peak value detecting unit 2b, a peak value storage unit 2c, a peak value difference arithmetic unit 2d, and an obstacle recognition unit 2e. The transmission and reception device 3 includes an ultrasonic transmitter (transmission unit) 4 for transmitting an ultrasonic wave as a sensing wave and an ultrasonic receiver (reception unit) 5 for receiving a ultrasonic wave returning as a reflective wave. The ultrasonic transmitter 4 and the ultrasonic receiver 5 are individual components integrated into one sensor body. The integrated ultrasonic transmitter 4 and the ultrasonic receiver 5 are configured to transmit an ultrasonic wave to a detection area and receive the ultrasonic wave, which reflects on a detected object to return as a reflective wave from the detection area. One ultrasonic element may be provided to function as both the ultrasonic transmitter 4 and the ultrasonic receiver 5 by switching its function to be operated as a transmission unit and a reception unit. The ultrasonic transmitter 4 is configured to output an ultrasonic wave as a sensing wave at a predetermined frequency in a range of 20 to 100 kHz. The ultrasonic transmitter 4 is configured to output a sensing wave including continuous ten to several tens of pulses at one time. The ultrasonic transmitter 4 is configured to output the sensing wave repeatedly at a predetermined interval. The ultrasonic transmitter 4 is configured to output an ultrasonic wave in a predetermined angular range in a direction of a transmission plane. The ultrasonic receiver 5 is configured to receive a reflective wave from a detection area S in a predetermined angle range α in a direction of a reception plane.

Figure 2A:
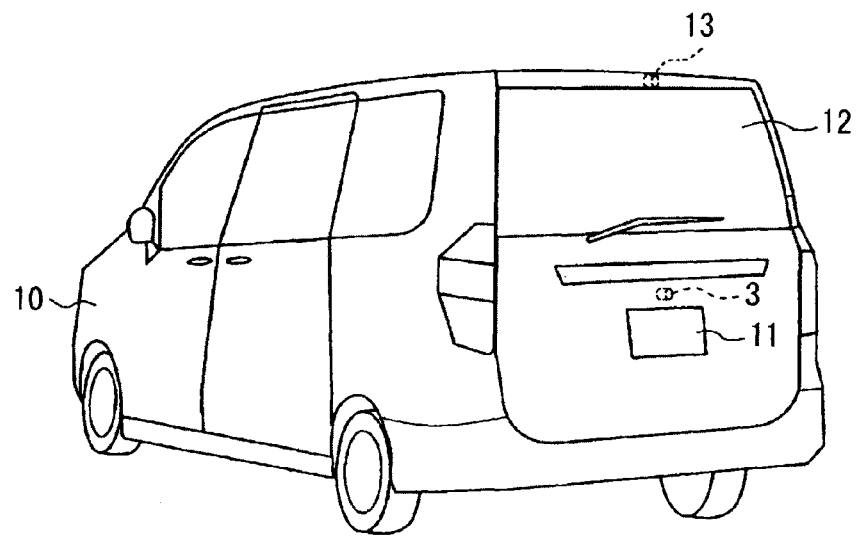
FIGS. 2A, 2B are perspective views each showing a location of a transmission and reception device of the obstacle detection apparatus mounted to a vehicle.
Figure 2B:
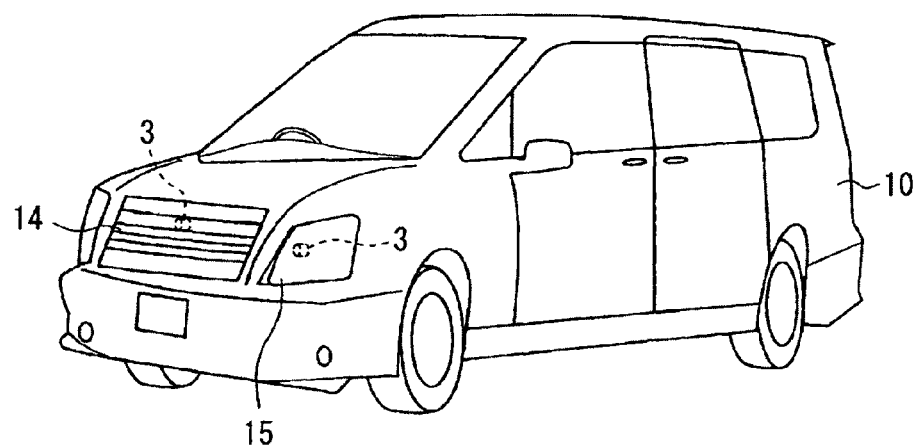

Each of FIGS. 2A, 2B shows a detailed position of the transmission and reception device 3. For example, as shown in FIG. 2A, the transmission and reception device 3 is located at an upper position of a license plate 11 in a rear body of an automobile (vehicle) 10. Alternatively, the transmission and reception device 3 may be embedded in a washer nozzle 13 of a rear window 12. In addition to detection of an obstacle at a rear side, the transmission and reception device 3 may be provided inside of a radiator grill 14 of a front body of the automobile 10 so as to detect an obstacle at a front side and/or may be provided inside of a headlight 15 so as to detect an obstacle at a corner side. The position of the transmission and reception device 3 is preferably higher than a bumper of an automobile, at least. Specifically, the position of the transmission and reception device 3 is higher than 50 cm from a ground surface. The position of the transmission and reception device 3 is preferably higher than 1 mm from a ground surface.

Figure 3:
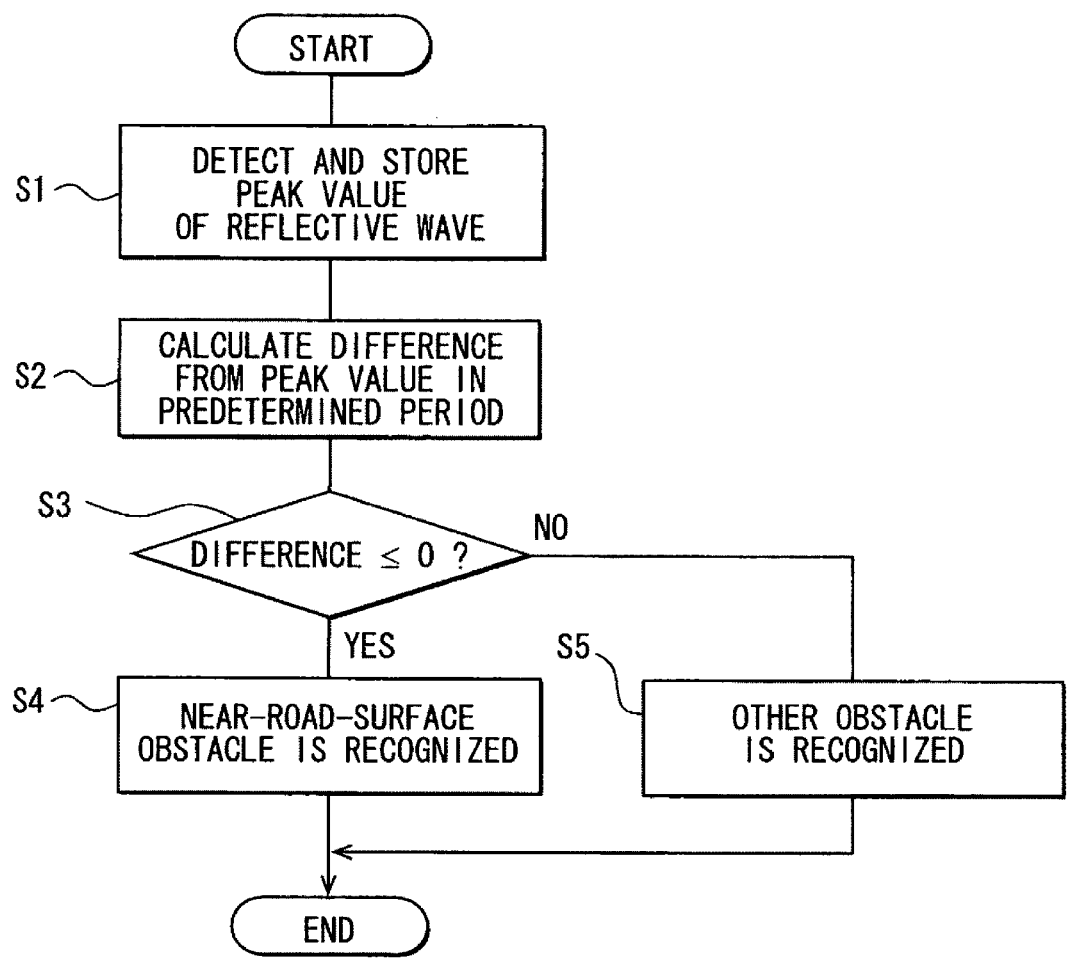
FIG. 3 is a flowchart showing a recognition operation of a detected object according to the first embodiment.
Figure 4A:
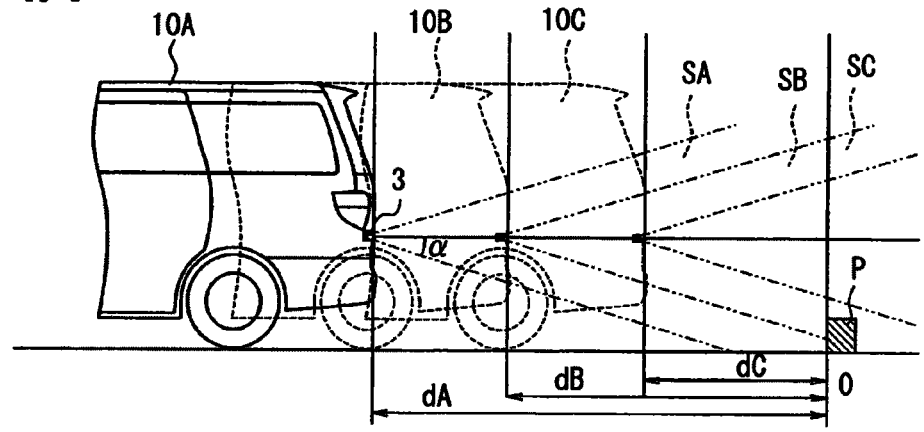
FIGS. 4A to 4C are explanatory views each showing the detection operation.
Figure 4B:
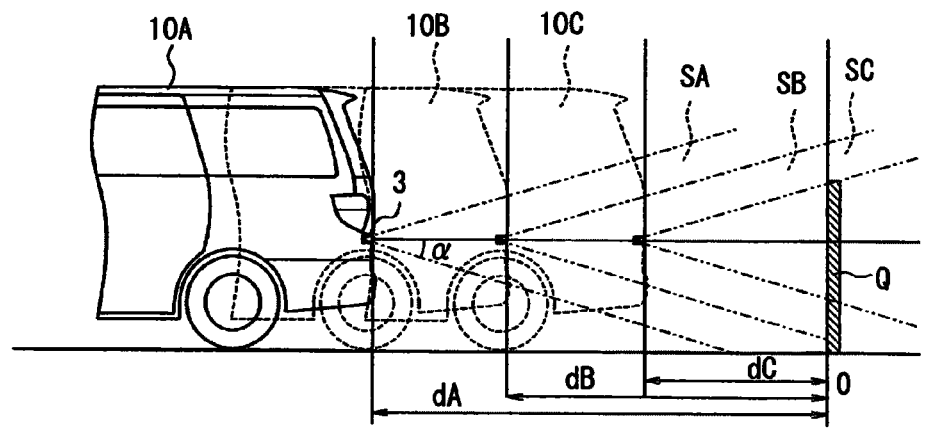
Figure 4C:
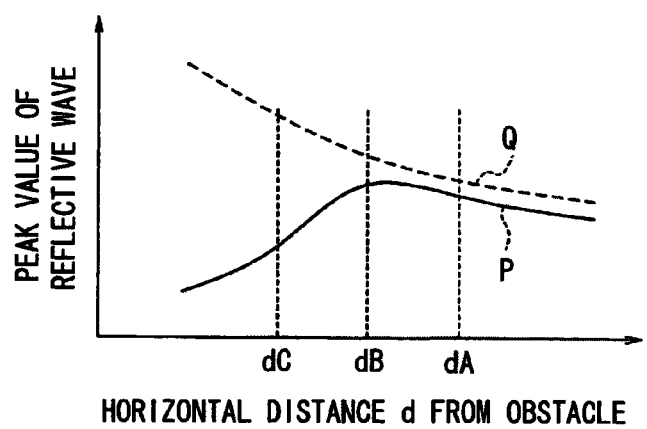

Subsequently, a detecting operation of an obstacle will be described with reference to FIGS. 3, 4. FIG. 3 shows a processing of an obstacle recognition program executed by the ECU 2. The obstacle recognition program is stored in advance and executed at a suitable time point when the automobile is parked, for example. FIGS. 4A to 4C shows an operation of the obstacle recognition program in detail. Specifically, FIG. 4A shows a case where an obstacle is a near-road-surface obstacle P, which is close to a road surface, such as a wheel stopper and a curbstone. FIG. 4B shows a case where an obstacle is an other obstacle Q other than the near-road-surface obstacle P, such as a wall and a pole. FIG. 4C shows detection signals being different in response to the kind of the obstacles P and Q.

The ECU 2 starts execution of the obstacle recognition program shown in FIG. 3 at a time point at which the automobile 10 moves backward. Specifically, the ECU 2 starts execution of the obstacle recognition program at a time point at which a shift lever is set to a back position, for example. Thereafter, the ECU 2 repeatedly executes the obstacle recognition program at a predetermined interval. At this time, the ECU 2 transmits a signal to cause the transmission signal generating unit 2a to transmit a signal so as to cause the ultrasonic transmitter 4 of the transmission and reception device 3 to output a ultrasonic wave signal. Thereby, the ultrasonic transmitter 4 transmits an ultrasonic wave signal as a sensing wave toward the detection area S. More specifically, the ultrasonic transmitter 4 repeatedly outputs an ultrasonic wave at the predetermined frequency and including ten to several tens of pulses as one transmission signal. For example, the detection area S is set at a front side of the position of the transmission and reception device 3 to spread in an angular range α, for example. In this case, the detection area S is set at a rear side of the automobile 10. When a detected object such as a wheel stopper, a curbstone, a wall, a pole, and/or the like exists in the detection area S, a ultrasonic wave signal hits on the detected object to be reflected from the detected object. The reflective wave is detected by the ultrasonic receiver 5.

At S1 in FIG. 3, the ECU 2 first causes the peak value detecting unit 2b to detect a maximum value of the reflective wave, which is received by the ultrasonic receiver 5, as a peak value. The ECU 2 further causes the peak value storage unit 2c to store the peak value. Subsequently, at S2, the ECU 2 causes the peak value difference arithmetic unit 2d to calculate a peak value difference between a peak value in a predetermined period and a peak value presently detected by the peak value detecting unit 2b. The peak value in a predetermined period is, for example, the peak value previously stored in the peak value storage unit 2c.

Subsequently, at S3, the ECU 2 causes the obstacle recognition unit (object determination unit) 2e to determine whether the calculated value of the peak value difference is a negative value. When the peak value difference is a negative value, S3 makes a positive determination. In this case, at S4, the obstacle recognition unit 2e determines that the detected object, which generates the reflective wave, is a near-road-surface obstacle P such as a wheel stopper and a curbstone. Alternatively, when the peak value difference is a positive value, S3 makes a negative determination. In this case, at S5, the obstacle recognition unit 2e determines that the detected object is an other obstacle Q such as a wall and a pole.

As follows, the above determination will be described further in detail with reference to FIGS. 4A to 4C. FIG. 4A shows a state where a near-road-surface obstacle P, such as a wheel stopper, exists behind the automobile 10. FIG. 4B shows a state where an other obstacle Q, such as a pole, exists behind the automobile 10. In the drawings, the automobile 10 in positions distant from the obstacle is successively denoted by 10A, 10B, and 10C in order.

In FIG. 4A, at the position of the automobile 10A, the near-road-surface obstacle P exists at a distance dA in the detection area SA of the transmission and reception device 3. At the position of the automobile 10B, the near-road-surface obstacle P exists at a distance dB and located in a boundary of the detection area SB. At the position of the automobile 10C, the near-road-surface obstacle P exists at a distance dC and located outside of the detection area SC. On the other hand, in FIG. 4B, at any of the positions of the automobile 10A to 10C, the other obstacle Q, which is a pole, exists in the corresponding detection areas SA to SC of the transmission and reception device 3.

At the position of the automobile 10A, the transmission and reception device 3 receives a reflective wave from either the near-road-surface obstacle P or the other obstacle Q. Therefore, the transmission and reception device 3 obtains equivalent peak values. Further, at the position of the automobile 10A, at which a reflective wave is received from either the obstacles P, Q, the peak values of the reflective wave increases, as the automobile 10 approaches the obstacles P, Q to reduce the distance dA. In this state, it cannot be determined whether the detected object is a near-road-surface obstacle P or an other obstacle Q.

Subsequently, when the automobile 10 moves closer to the position of the automobile 10C beyond the position of the automobile 10B, the peak values of the reflective wave from both the detected objects cause a difference therebetween at the position of the automobile 10B as a boundary. Specifically, as shown in FIG. 4A, when the automobile 10 moves to a distance smaller than the distance dB, the near-road-surface obstacle P, which is low in height, is outside of the detection area SA. Accordingly, a component of a reflective wave received by the ultrasonic receiver 5 of the transmission and reception device 3 is rapidly decreased, and hence the obtained peak value is also lowered. On the other hand, even when the automobile 10 moves closer to the other obstacle Q, the other obstacle Q exists inside of the detection area S. Therefore, even when the automobile 10 approaches from the distance dA to the distance dC, the obtained peak value of a reflective wave is still a large value.

Consequently, as shown in FIG. 4C, change in the peak values show a difference therebetween according to the horizontal distance d between the transmission and reception device 3 and one of the near-road-surface obstacle P and the other obstacle Q. Specifically, when the automobile 10 moves to a position closer than the distance dB, the change in the peak values becomes different from each other. When the peak value difference is a negative value, the peak value become smaller. In this case, the obstacle can be recognized to be a near-road-surface obstacle P. Alternatively, when the peak value difference is a positive value, the peak-value become larger. In this case, the obstacle can be recognized to be an other obstacle Q.

Figure 5:
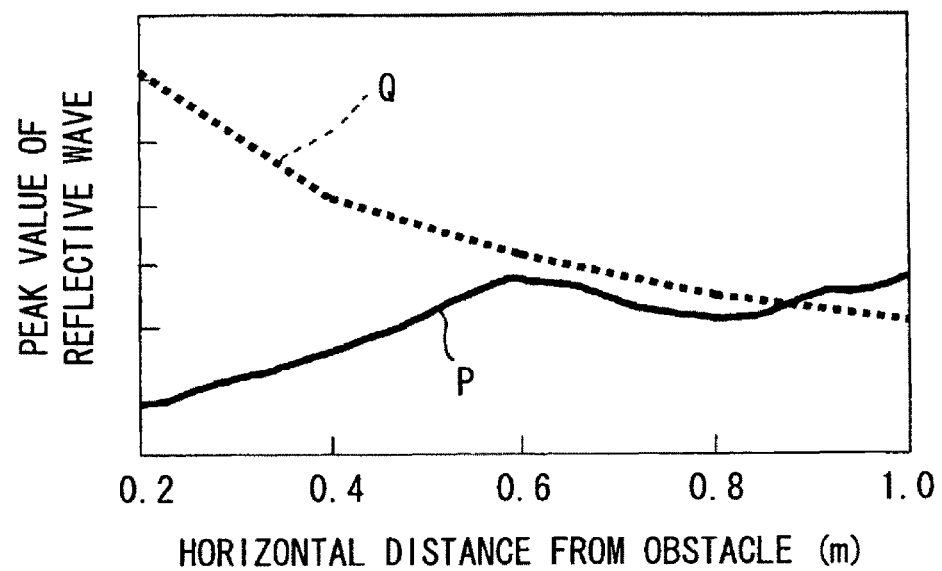
FIG. 5 is a graph showing one example of a detection result.

FIG. 5 shows a result obtained by an actual measurement. In FIG. 5, a horizontal axis indicates a horizontal distance from an obstacle, and a vertical axis indicates a peak value of a reflective wave. For example, when the distances to obstacles P, Q, which are detected objects, become small from 0.9 m to 0.6 m, both the peak values substantially become large. Thereafter, as the distances to the obstacles P, Q become further small, the peak value in case of a near-road-surface obstacle P becomes smaller, and the peak value in case of an other obstacle Q substantially continues to become larger. Thereby, when the automobile 10 moves backward closer to a detected object by a distance of 0.5 m, the detected object can be determined to be a near-road-surface obstacle P or an other obstacle Q.

According to the first embodiment, the transmission and reception device 3 has a simple structure including a pair of the ultrasonic transmitters 4 and the ultrasonic receiver 5. With such a simple structure, the ECU 2 is capable of determining whether a detected object is a near-road-surface obstacle P or an other obstacle Q by calculating the peak value difference in a detected reflective wave. Further, the determination result can be effectively used as information for performing a driving support. For example, the determination result can be used as guide information when the automobile 10 is being parked. In addition, the determination result can be used as information for controlling a driving operation according to a determination result of a kind of an obstacle. Thus, the determination result can be applicable to an applied technology for avoiding a defect such as collision.

In the above-described structure, the relationship between the position of the transmission and reception device 3 and the detection area S relates to the horizontal distance when a near-road-surface obstacle P is detected as a detected object. Specifically, as the spread angular range α of the detection area S becomes small, or as the height of: the position of the transmission and reception device 3 becomes high, a distance, at which the near-road-surface obstacle P becomes outside of the detection area S, becomes large. It is noted that, as the horizontal distance becomes large, a reflective wave causes large attenuation. Therefore, it is necessary to set the distance, at which the near-road-surface obstacle P becomes outside of the detection area S, to a small value so as to detect the reflective wave correctly for recognition of an obstacle. Desirable detection can be performed by setting each of these conditions appropriately in accordance with a detected object.

Second Embodiment

Figure 6:
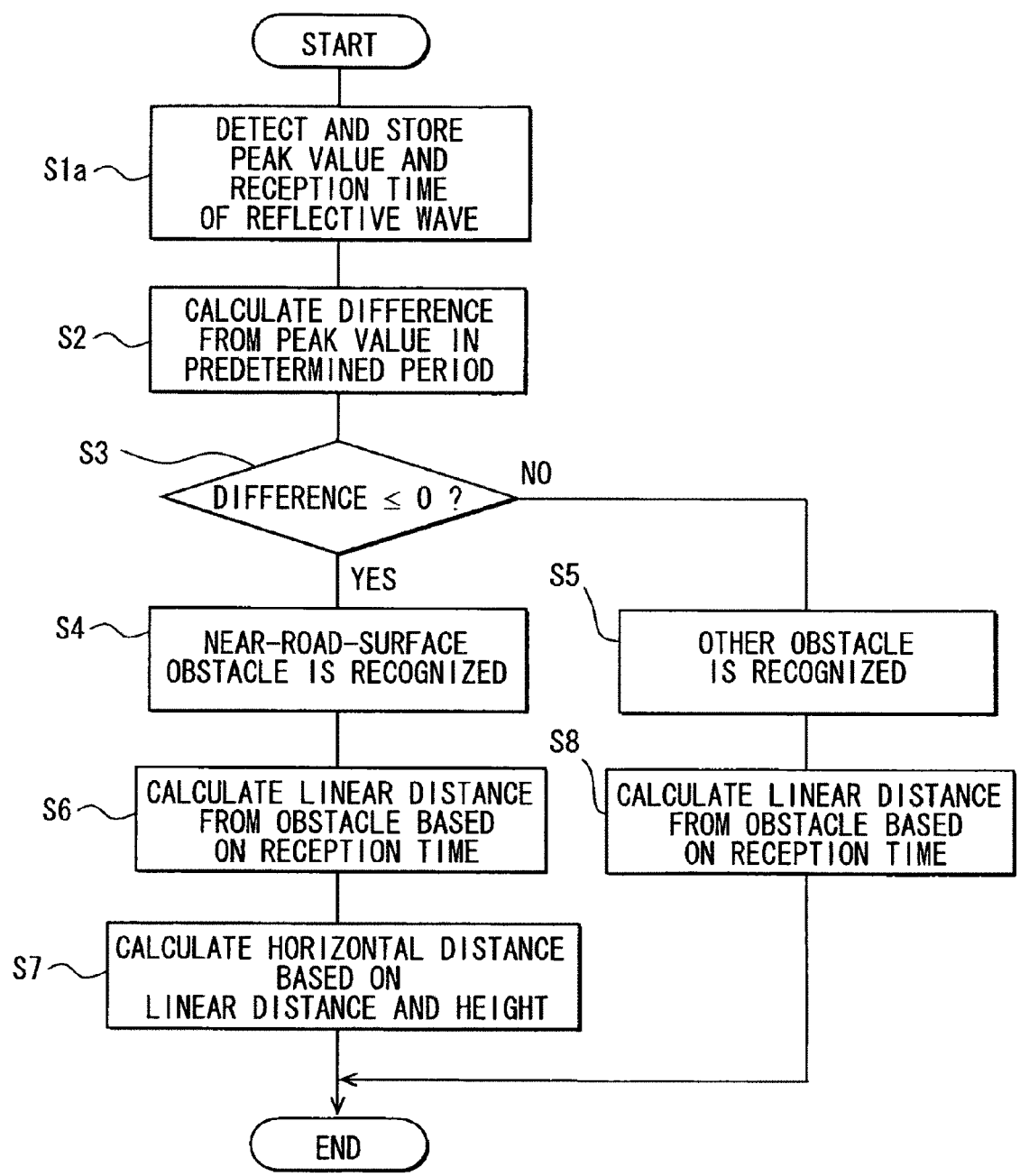
FIG. 6 is a flowchart showing a recognition operation of a detected object according to a second embodiment.
Figure 7:
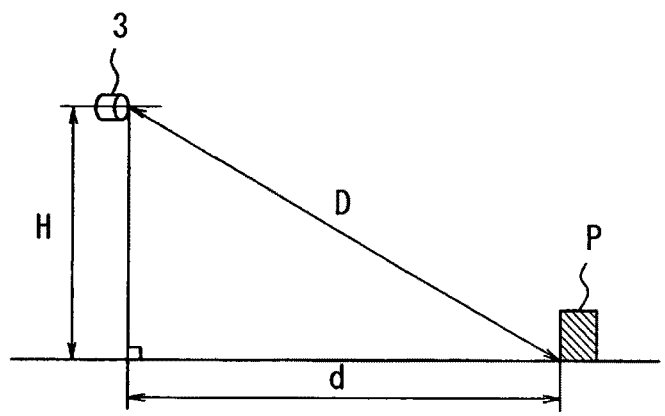
FIG. 7 is an explanatory view showing a detection operation.
Figure 8:
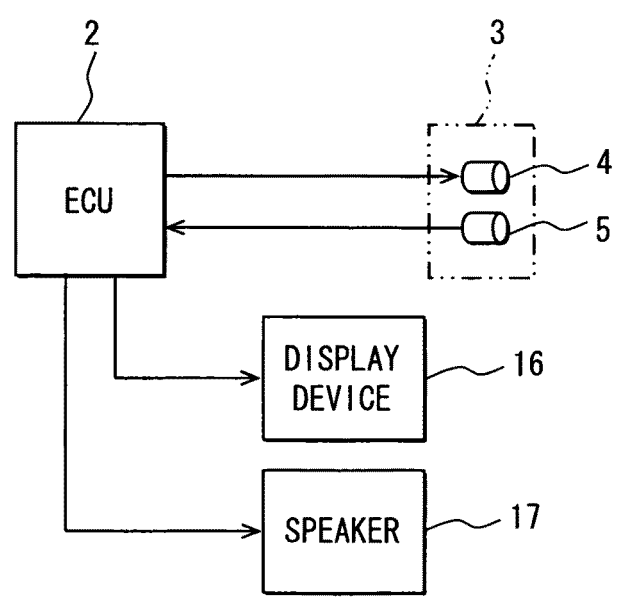
FIG. 8 is a block diagram showing an obstacle detection apparatus according to a third embodiment.

FIGS. 6, 7 relate to a second embodiment of the present invention. The present second embodiment is different from the first embodiment in an additional function to calculate a horizontal distance from a near-road-surface obstacle P when it is determined that a detected object is the near-road-surface obstacle P. The position of the transmission and reception device 3 is located at an upper position of the license plate 11 of the automobile 10 or in the washer nozzle 13 of the rear window. Therefore, the position of the transmission and reception device 3 and a detected object such as a near-road-surface obstacle P with a low height have a difference therebetween in height in a vertical direction. Accordingly, even when a linear distance from a detected object can be detected, an error arises in the horizontal distance from a detected object when being seen from the automobile 10. Therefore, in the present embodiment, an error in a distance attributed to a vertical distance between the transmission and reception device 3 and a detected object is corrected to obtain and output an accurate horizontal distance. Specifically, in the present embodiment, the ECU 2 is provided with a function to detect a reception time T between transmission of the transmitted signal and reception of a reflective wave, in addition to the function to detect a peak value using the peak value detecting unit 2b. Further, as shown in FIG. 7, the obstacle recognition unit 2e calculates a horizontal distance d in accordance with a relationship between a linear distance D, which is obtained from the reception time T, and a height H of the position of the transmission and reception device 3.

FIG. 6 shows the obstacle recognition program. As follows, an operation different from that of the first embodiment will be described. At S1a, the ECU 2 detects a peak value of a reflective wave and simultaneously detects the reception time T in an operation to store the peak value in the peak value storage unit 2c. At S6, when determining that a detected object is a near-road-surface obstacle P, the ECU 2 calculates the linear distance D from the near-road-surface obstacle P in accordance with the reception time T at that time. The linear distance D can be calculated by multiplying an acoustic velocity V of an ultrasonic wave by T/2, which is a half value of the reception time T for one way transmission.

At S7, the ECU 2 calculates the horizontal distance d in accordance with a relationship between the calculated linear distance D from the near-road-surface obstacle P and the height H of the transmission and reception device 3. Specifically, the horizontal distance d can be calculated by d=$\sqrt{(D^2-H^2)}$ based on the generally known Pythagorean theorem.

When a detected object is an other obstacle Q, at S8, the ECU 2 similarly calculates the linear distance D and obtains the horizontal distance d from the calculated linear distance D. In this manner, even when a detected object is a near-road-surface obstacle P, the horizontal distance d can be correctly obtained.

According to the present second embodiment, the obstacle recognition unit 2e obtains the reception time T of a reflective wave from a detected object and calculates the horizontal distance d based on the linear distance D calculated based on the reception time T when the detected object is a near-road-surface obstacle P. Therefore, the horizontal distance d can be correctly detected in accordance with a kind of a detected object.

Third Embodiment

FIGS. 8 to 11 relate to a third embodiment of the present invention. The present third embodiment is different from the above embodiments in an additional display device (display unit, indication portion) 16 as a display unit and an additional speaker (sounding unity 17 both of which function as information units. In the present embodiment, a driver or a passenger is notified of whether a detected object is a near-road-surface obstacle P or an other obstacle Q using the display device 16 and/or the speaker 17 with an indication and/or a voice.

The ECU 2 executes the obstacle recognition program and performs an information operation according to a determination result when determining that a detected object is a near-road-surface obstacle P or an other obstacle Q. In the information operation, the speaker 17 causes sound differently in accordance with a notification pattern shown in FIG. 9, for example, so as to inform a kind of a detected object.

In the first notification pattern, the speaker 17 outputs a high-tone sound when a detected object is determined to be an other obstacle Q, such as a pole and a wall, and the speaker 17 outputs a low-tone sound when a detected object is determined to be a near-road-surface obstacles P, such as a wheel stopper and a curbstone. In the second notification pattern, the speaker 17 outputs a loud sound when a detected object is determined to be an other obstacle Q, and the speaker 17 outputs a soft sound when a detected object is determined to be a near-road-surface obstacle P. In the third notification pattern, the speaker 17 repeatedly outputs patterned long sounds of beep, beep, beep when a detected object is determined to be an other obstacle Q, and the speaker 17 repeatedly outputs patterned short sounds of blip, blip, blip when a detected object is determined to be a near-road-surface obstacle P. In the fourth notification pattern, the speaker 17 outputs a synthetic voice of "there is an obstacle" when a detected object is determined to be an other obstacle Q, and the speaker 17 outputs a synthetic voice of "there is an obstacle downward" when a detected object is determined to be a near-road-surface obstacle P.

In FIG. 9, four kinds of notification patterns are shown. It is noted that any notification patterns, which is recognizable when an occupant hears a sound of one of the notification patterns, may be employed. Furthermore, information relating to a distance from a detected object may be recognizable by increasing a tone of a sound, increasing a sound volume, shortening a repetition cycle of a notification pattern, and modifying information notified via voice, as the automobile 10 approaches the detected object. In addition, a user may choose a pattern, which is easily recognizable.

Figure 10A:
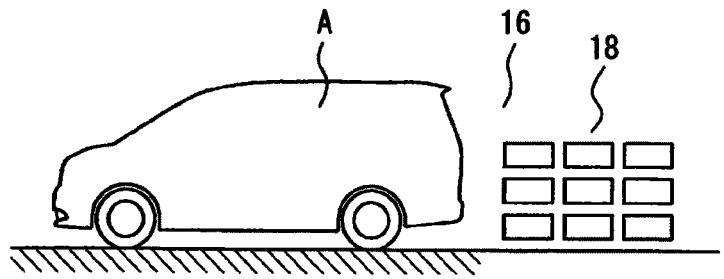
FIGS. 10A to 10D are explanatory views each showing a first example of indication.
Figure 10B:
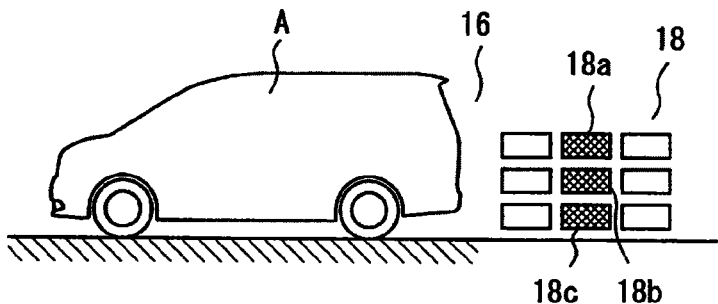

FIG. 10A shows an example of indication on a display device 16. Specifically, the display device 16 indicates an image A of an automobile and a display pattern 18 including nine segments behind the image A. The display pattern 18 is constituted by a matrix of horizontal three segments and vertical three segments, for example. As shown in FIG. 10B, the ECU 2 causes the display device 16 to light three segments of the display pattern 18 of the display device 16 in the vertical direction in one display mode when an other obstacle Q, such as a pole and a wall, is detected. In this case, an indication position may be modified according to a detected position when the horizontal distance d from a detected object is calculated similarly to the second embodiment.

Figure 10C:
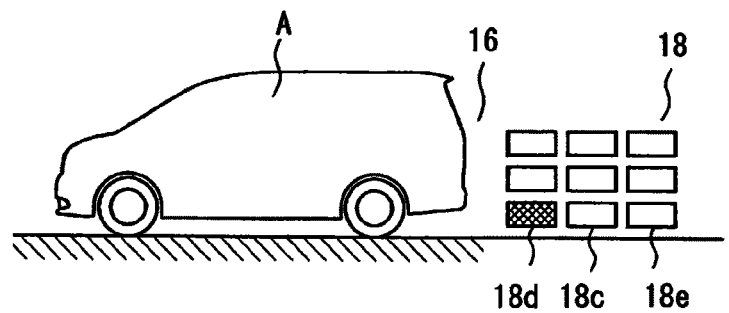
Figure 10D:
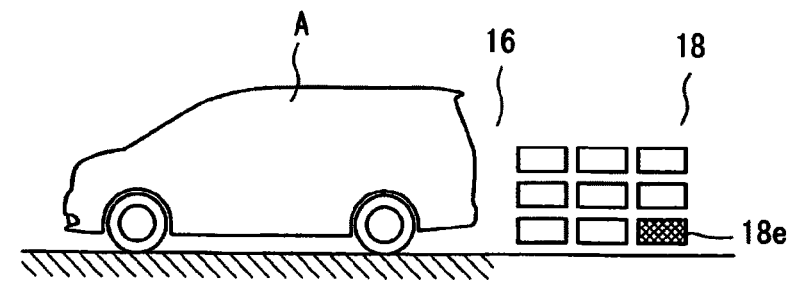

Alternatively, as shown in FIGS. 10C, 10D, the ECU 2 may light one of bottom segments 18c, 18d, 18e of the display patterns 18 of the display device 16 in other display modes of the display device 16 when a near-road-surface obstacles P, such as a wheel stopper and a curbstone, is detected. In this case, one or two of 18d, 18c, 18e may be displayed according to a detected position when the horizontal distance d from a detected object is calculated similarly to the second embodiment.

The ECU 2 may partially or entirely blink the display pattern 18 or may partially or entirely modify a color of the display pattern 18 according to a kind of a detected object.

Furthermore, indication using the display device 16 may be combined with sounding using the speaker 17 so as to effectively and steadily perform notification.

Figure 11:
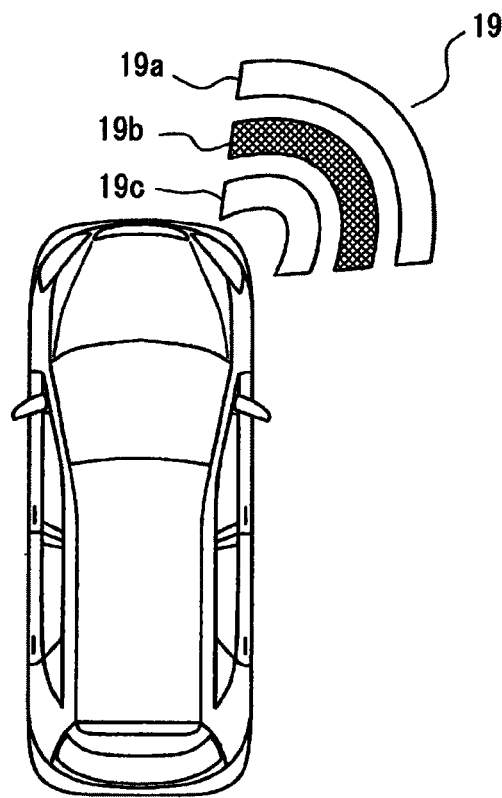
FIG. 11 is an explanatory view showing a second example of indication.

FIG. 11 shows an example of indication when the transmission and reception device 3 is provided to a headlight 15. For example, when an obstacle detection device is provided as a corner sensor, a display pattern 19 corresponding to a corner part of the automobile 10 is provided. For example, the display pattern 19 includes three segments 19a, 19b, 19c correspondingly to a long distance, a middle distance, and a short distance. Further, the display pattern 19 may be indicated such that a color thereof is partially or entirely differed according to a kind of a detected object. For example, when an other obstacle Q is detected, the display pattern 19 may be indicated in a green color. Alternatively, when a near-road-surface obstacle P is detected, the segments 19a to 19c may be partially or entirely indicated in a red color and may be modified according to a detected distance. In this manner, a user can easily and visually recognize a detected object.

According to the third embodiment, the display device 16 and/or, the speaker 17 is provided as an information unit to indicate a detected object and/or to notify a detected object via sound according to a determination result of whether the detected object is a near-road-surface obstacle P or an other obstacle Q. Therefore, a detected object can be steadily notified on determination of the detected object.

Fourth Embodiment

Figure 12:
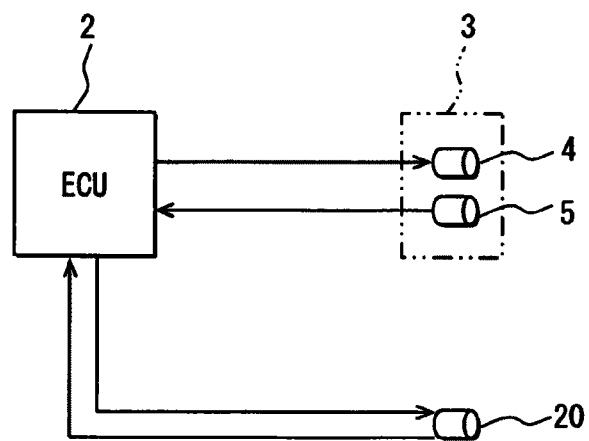
FIG. 12 is a block diagram showing an obstacle detection apparatus according to a fourth embodiment.
Figure 13:
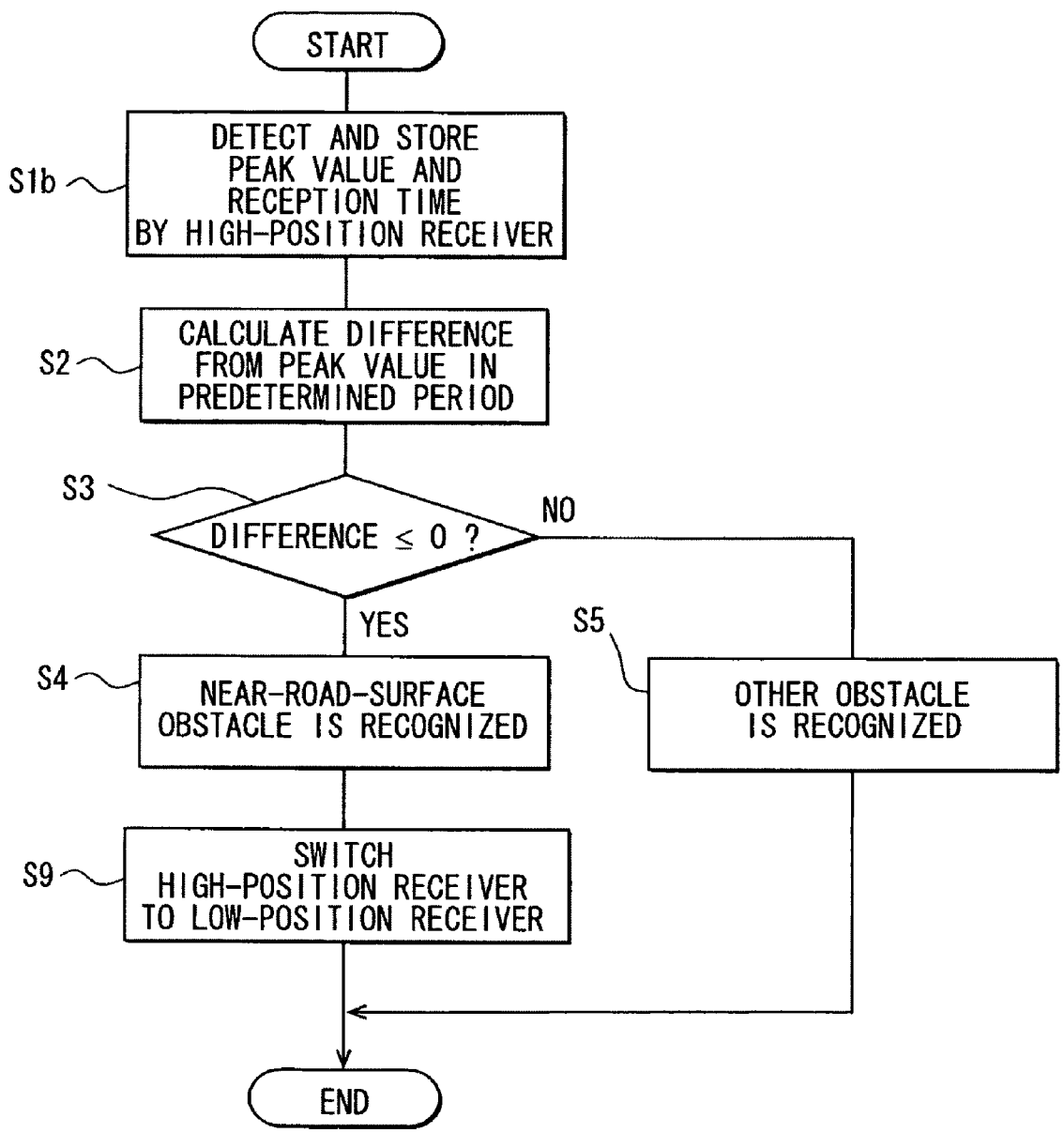
FIG. 13 is a flowchart showing a recognition operation of a detected object.

FIGS. 12 to 14 show a fourth embodiment of the present invention. As follows, difference from the second embodiment will be described. In the present embodiment, an ultrasonic receiver 20 is added as a low position reception unit in addition to the transmission and reception device 3. For example, as shown in FIG. 14, the ultrasonic receiver 20 is embedded in a rear bumper 21 of the automobile 10. The ultrasonic receiver 20 is located at this height, thereby a detection area F is set at the height lower than the detection area S. Thus, the detection area F is capable of including a reception region of a reflective wave outside the detection area S of the transmission and reception device 3. In this case, the ultrasonic transmitter 4 of the transmission and reception device 3 is set to output an ultrasonic wave in an angular range larger than the detection area S of the ultrasonic receiver 5.

FIG. 13 shows an obstacle recognition program executed by the ECU 2. As follows, an operation different from that of the second embodiment will be described. In the present embodiment, the ultrasonic receiver 20 as a low position reception unit is provided in addition to the ultrasonic receiver 5, and therefore an operation relating to discrimination therebetween will be described in detail.

At S1b, the ECU 2 causes the ultrasonic receiver 5 of the transmission and reception device 3 located at a high position to detect a peak value and a reception time T of a reflective wave. The ECU 2 causes the peak value storage unit 2c to store the detected peak value and reception time T. At S9, the ECU 2 switches the ultrasonic receiver 5 to the ultrasonic receiver 20 to cause the ultrasonic receiver 20 to receive a reflective wave thereafter when determining that a detected object is a near-road-surface obstacle P. Without the ultrasonic receiver 20, a near-road-surface obstacle P is once detected, and thereafter, when the near-road-surface obstacle P moves outside the detection area S of the ultrasonic receiver 5, detection of the near-road-surface obstacle P cannot be continued. On the contrary, in the present structure, the ultrasonic receiver 20 having the detection area F is capable of successively receiving a reflective wave to continue detecting of the near-road-surface obstacle P.

Figure 14A:
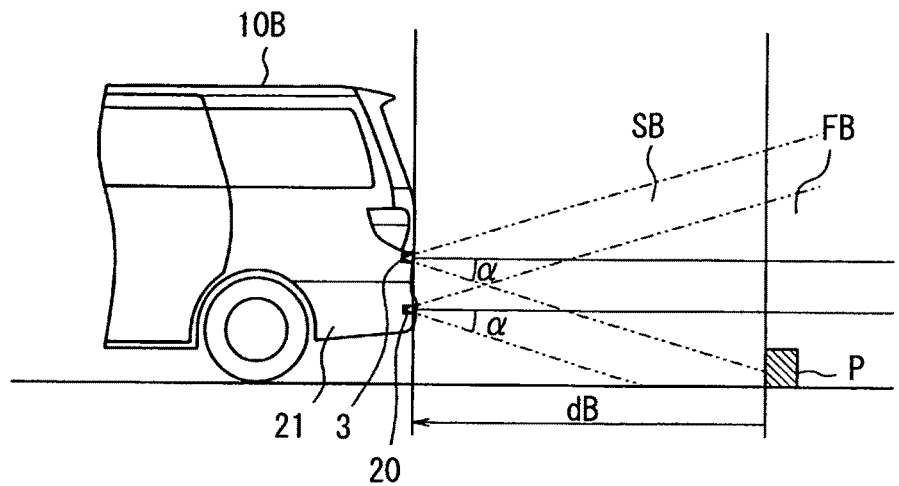
FIGS. 14A, 14B are explanatory views each showing a detection operation.

FIG. 14A shows the automobile 10 located at a position 10B at a horizontal distance dB from a near-road-surface obstacle P. At this time, the detection area FB of the ultrasonic receiver 20 located at the low position is in a range in which the ultrasonic receiver 20 is capable of receiving a reflective wave from a near-road-surface obstacle P. The transmission and reception device 3 has not determined a kind of a detected object. Therefore, the ultrasonic receiver 20 does not start detection of the near-road-surface obstacle P.

Figure 14B:
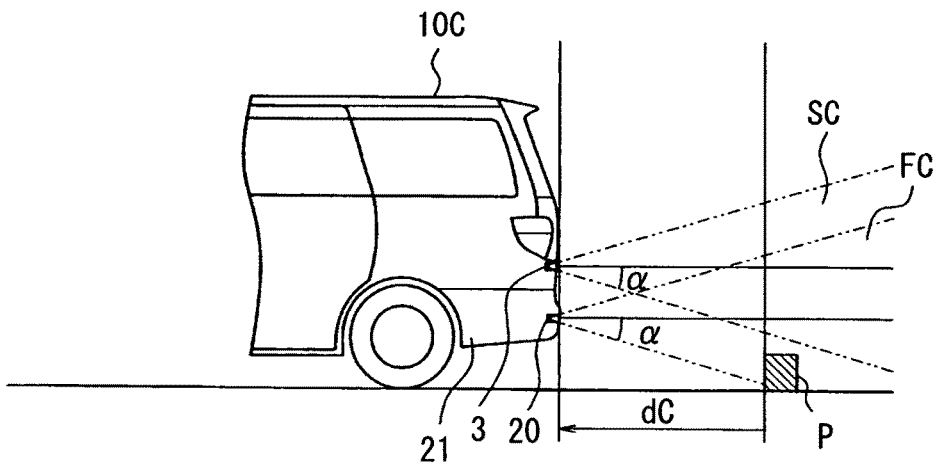
Figure 15:
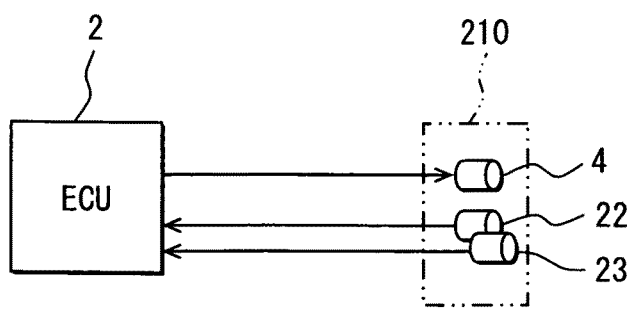
FIG. 15 is a block diagram showing, an obstacle detection apparatus according to a fifth embodiment.

As shown in FIG. 14B, the automobile 10 further moves backward to a position 10C at a horizontal distance dC, and the near-road-surface obstacle P further approaches the automobile 10. At this time, the near-road-surface obstacle P is outside the detection area SC of the ultrasonic receiver 5, thereby, the near-road-surface obstacle P is recognized based on a calculation result of a peak value difference, as described above. Thereafter, the ultrasonic receiver 20 located at the low position receives a reflective wave. In the present state, the near-road-surface obstacle P is included in the detection area FC of the ultrasonic receiver 20, thereby existence of the near-road-surface obstacle P can be determined, and the distance from the near-road-surface obstacle P can be detected.

According to the present fourth embodiment, the ultrasonic receiver 20 is provided in the rear bumper 21 of the automobile 10 as the low position reception unit. In the present structure, after recognizing a near-road-surface obstacle P, the ultrasonic receiver 5 is switched to the ultrasonic receiver 20 to set the detection area F at the low position so as to receive a reflective wave: Therefore, after recognizing a near-road-surface obstacle P, detection of a detected object can be continued.

The detection area S of the ultrasonic receiver 5 and the detection area F of the ultrasonic receiver 20 may have the same spread angular range α or may have different angular ranges. The detection area S and the detection area F may be arbitrary determined according to a condition such as a detected object and a detection distance.

Fifth Embodiment

FIGS. 15 to 18 relate a fifth embodiment of the present invention. The present fifth embodiment is different from the second embodiment in an additional transmission and reception device 210 instead of the transmission and reception device 3 and configured to detect an obstacle behind the automobile 10 in the horizontal direction. The transmission and reception device 210 includes the ultrasonic transmitter 4 and two ultrasonic receivers 22, 23. The two ultrasonic receivers 22, 23 are at a distance w from each other in the horizontal direction. The distance w is equivalent to a half-wave length ($\lambda/2$) of a transmitted ultrasonic wave.

The ECU 2 detects a phase difference $\Delta\phi$ of a reflective wave received by the two ultrasonic receivers 22, 23. Further, one or two of the ultrasonic receivers 22, 23 detects a peak value of a reflective wave to recognize a kind of a detected object, similarly to the first embodiment.

The following formula (1) defines a generally-used calculation of an azimuth angle $\Phi o$ of a reflective wave received by the two ultrasonic receivers 22, 23 based on the phase difference $\Delta\phi$. The following formula (2) defines a calculation of a corrected horizontal azimuth angle Φ in the present embodiment.

$$\phi_o = \sin^{-1}\left(\frac{\lambda}{2\pi w}\Delta\varphi\right) \quad (1)$$

$$\phi = \sin^{-1}\left(\frac{\lambda}{2\pi w \cos\theta}\Delta\varphi\right) \quad (2)$$

Figure 17:
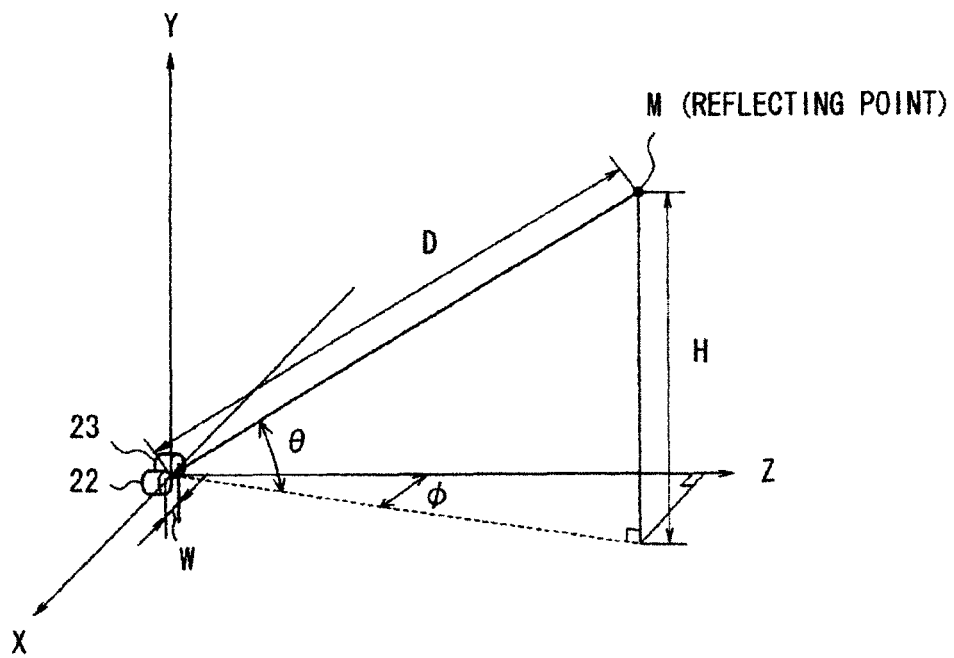
FIG. 17 is an explanatory view showing a detection operation.

As shown in FIG. 17, the two ultrasonic receivers 22, 23 are at the distance w from each other and have a difference in transmission paths therebetween relating to the azimuth angle (inclination angle) Φ when a reflective wave reaches to the two ultrasonic receivers 22, 23. The formula (1) is for calculating the azimuth angle Φo based on the phase difference Δφ. In FIG. 17, an x-axis and an y-axis define an x-y plane, which includes a receiving surface of the two ultrasonic receivers 22, 23. An z axis is perpendicular to the x-y plane. The x-z plane is in the horizontal direction with respect to the z axis. The formula (1) is for calculating the azimuth angle Φo in the x-z plane.

It is noted that, as shown in FIG. 17, when a near-road-surface obstacle P is recognized as a detected object, a reflective wave reaches not from a point in the x-z plane but from a reflecting point m. The reflecting point m is at an angle θ relative to the x-z plane in a direction of the y-axis, i.e., in the vertical direction. Therefore, when the azimuth angle Φo is calculated according to the formula (1), a detection error occurs due to the difference in the transmission paths, compared with a case where a reflective wave reaches from a point in the x-z plane. The angle θ in the vertical direction can be calculated based on a linear distance D and a height H to a detected object. The horizontal azimuth angle Φ in the formula (2) is corrected based on the angle θ.

Figure 16:
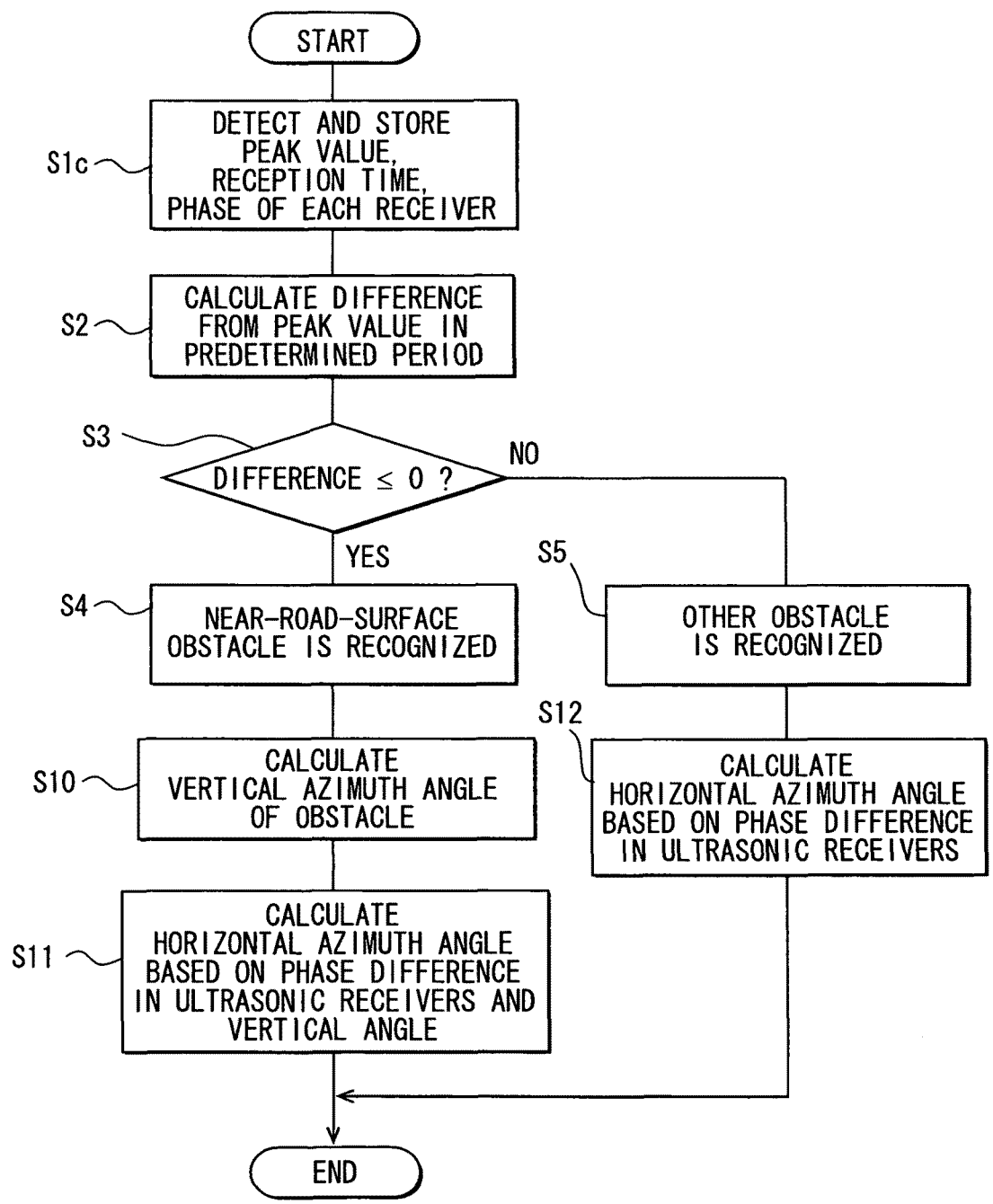
FIG. 16 is a flowchart showing a recognition operation of a detected object.

FIG. 16 shows an obstacle recognition program executed by the ECU 2. As follows, an operation different from that of the second embodiment will be described. At S1c, the ECU 2 obtains a peak value of a reflective wave received by the two ultrasonic receivers 22, 23. Further, the ECU 2 obtains a reception time T thereby to calculate the phase difference Δφ between received reflective waves of the two ultrasonic receivers 22, 23. Thus, the ECU 2 stores the phase difference Δφ. When the ECU 2 determines a detected object to be a near-road-surface obstacle P, at S11, the ECU 2 calculates the horizontal azimuth angle Φ from the formula (2) based on the phase difference Δφ obtained from the two ultrasonic receivers 22, 23 and the angle θ in the vertical direction. The angle θ is calculated based on the linear distance D and the height H calculated based on the reception time T.

Figure 18:
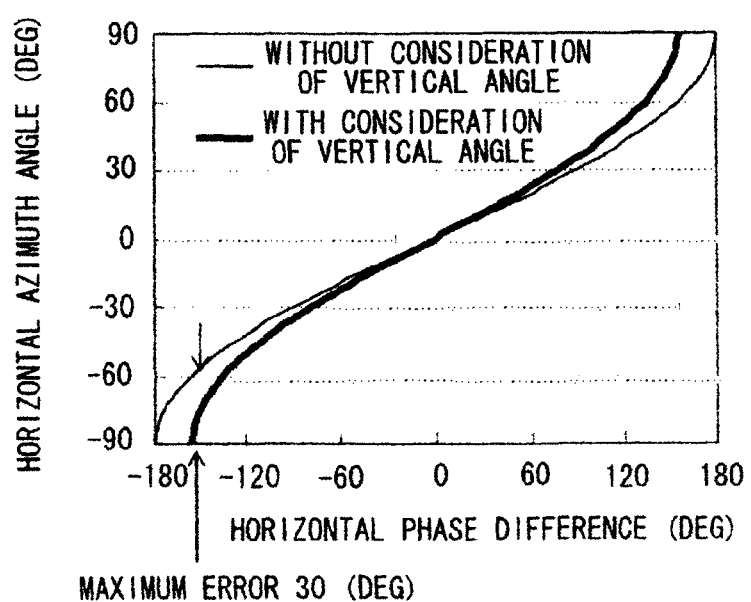
FIG. 18 is a graph showing a relationship between detection data and a correction value.

Alternatively, when the ECU 2 determines a detected object to be an other obstacle Q, at S12, the ECU 2 calculates the azimuth angle Φ from the formula (1) based on the phase difference Δφ detected by the two ultrasonic receivers 22, 23. FIG. 18 is a graph showing a correlation between the horizontal phase difference Δφ and the horizontal azimuth angle Φ corrected with the vertical angle θ of 30° and a correlation between the horizontal phase difference Δφ and the horizontal azimuth angle Φ without consideration of the vertical angle θ. FIG. 18 shows that an error in the calculated horizontal azimuth angle Φ becomes large, as the horizontal phase difference Δφ increases, i.e., as the horizontal phase difference Δφ is deviated from 0. For example, when the vertical angle θ is not taken into consideration, an error of 30° in the horizontal azimuth angle Φ occurs at the maximum.

According to the fifth embodiment, a detection error in the azimuth angle Φ relating to the height of the transmission and reception device 210 when a detected object is a near-road-surface obstacle P can be substantially eliminated. Thus, a position of the detected object can be further accurately obtained with a simple structure. In addition, with the two ultrasonic receivers, not only the horizontal azimuth angle but also the vertical azimuth angle can be detected. Therefore, a three-dimensional position of an obstacle can be obtained with a simple structure.

Other Embodiment

The present invention is not limited to the above embodiments and can be transformed or extended as follows, for example.

A frequency of an ultrasonic wave practically used as a sensing wave may be arbitrary determined in a range between about 20 kHz and about 100 kHz, for example. Further, the frequency of a sensing wave may be determined to be lower than about 20 kHz or to be higher than about 100 kHz.

A sensing wave is not limited to an ultrasonic wave and may be an electromagnetic wave. The transmission and reception device may be located at a suitable position higher than a bumper.

The detection result shown in FIG. 5 is one example. Practically, a detected distance depends on a position of the transmission and reception device 3, an output power intensity of an ultrasonic wave, a shape of a detected object, and the like. Therefore, various values of a detected distance may be practically set.

In the above embodiments, a stored peak value may be updated to a largest level of a peak value, and a difference from the stored peak value may be calculated. Alternatively, a peak value may be stored in each time, and a difference between the stored peak value and a subsequently detected peak value may be calculated. Further, peak values may be stored for two or more times, and difference between subsequently detected peak values and stored peak values may be calculated.

The transmission and reception device 3 may be one component of an ultrasonic transmission and reception device functioning as both a transmission unit and a reception unit. In this case, the ultrasonic transmission and reception device cannot receive a reflective wave in a period of reverberation after transmitting an ultrasonic wave. However, reverberation practically exerts an effect to reception of a reflective wave in a distance of about 20 cm or less. Therefore, such an ultrasonic transmission and reception device can be practically applicable.

In the above embodiments, the transmission and reception device 3 includes both the ultrasonic transmitter 4 and the ultrasonic receiver 5. Alternatively, the ultrasonic transmitter 4 and the ultrasonic receiver 5 may be located at separate positions.

In the fourth embodiment, the ultrasonic receiver (low position reception unit) 20 functions as a receiver. Alternatively, the ultrasonic receiver 20 may function as a low-position transmission and reception device. In this case, after a near-road-surface obstacle is recognized, the transmission and reception device 3 may be switched to the low-position transmission and reception device.

The unit for storing a peak value may cumulatively store peak values. In this case, difference between a presently detected peak value and multiple peak values detected and stored in the past may be calculated thereby to reduce an erroneous detection due to an error component such as noise so as to make an accurate determination according to the change.

The vehicle is not limited to the automobile 10 shown and described in the above embodiments. The vehicle may be various objects such as a sedan-type passenger car, a large-size vehicle, such as a track and a bus, a special vehicle, a rail car, an industrial robot, an electric wheelchair.

The vehicles is one example of a movable object. The movable object may be a movable robot and a human having the obstacle detection apparatus.

Summarizing the above embodiments, a transmission unit of a transmission and reception device transmits a sensing wave at a predetermined interval. A reception unit receives a reflective wave from a detection area. A peak value detecting unit detects a peak value of the reflective wave received by the reception unit and stores the detected peak value. A difference arithmetic unit calculates a difference in values of the peak value, which changes with movement of a movable object closer to a detected object. An object determination unit determines the detected object to be a near-road-surface obstacle, which exists at a position close to a road surface when the difference in the values of the peak value calculated by the difference arithmetic unit is a negative value. The object determination unit determines the detected object to be an other obstacle, which exists at a position higher than the position close to the road surface when the difference in the values of the peak value calculated by the difference arithmetic unit is a positive value.

In the present structure, the obstacle detection apparatus need not include a device having an array structure of multiple detection elements for recognizing a kind of an object, and thereby the structure of the obstacle detection apparatus can be simplified. Thus, the obstacle detection apparatus is capable of recognizing whether a detected object is a near-road-surface obstacle or not with a simple structure when the movable object moves closer to a detected object.

The object determination unit is configured to determine the kind of the detected object to be the near-road-surface obstacle when being at a position where the difference becomes a negative value due to the detected object relatively moves out of the detection area with movement of the movable object closer to the detected object. When the transmission and reception device receives the reflective wave from a detected object with low height such as a near-road-surface obstacle, the detected object relatively moves away from a detection area of the transmission and reception device with movement of the movable object closer to the detected object. The detected object can be recognized at the time point. That is, a near-road-surface obstacle at a predetermined distance can be steadily detected by setting the distance and the detection area according to a height of a detected object.

The transmission and reception device may be located at a position higher than a bumper of the movable object. In this case, the detection area of the reception unit is set at a high position, and thereby a near-road-surface obstacle at a distant position from the movable object can be suitably recognized. Further in this case, by adjusting the height according to an angle of the detection area, a receivable angular range, and the like of the reception unit, a near-road-surface obstacle at a desired distance can be recognized.

A linear distance arithmetic unit is configured to detect a time period between a time point, at which the transmission unit transmits the sensing wave, and a time point, at which the reception unit receives the reflective wave from the detected object, and configured to calculate a linear distance from the detected object based on the detected time period and a speed of the sensing wave. A horizontal distance arithmetic unit is configured to calculate a horizontal distance from the near-road-surface obstacle based on the linear distance detected by the linear distance arithmetic unit and the height of the transmission and reception device when the object determination unit determines the detected object to be the near-road-surface obstacle. Thus, a detection error due to a difference in the height between a reception unit and a near-road-surface obstacle can be reduced. Thereby, the horizontal distance between the movable object and the near-road-surface obstacle can be detected with sufficient accuracy.

A horizontal direction reception unit is located at a height substantially equivalent to a height of the reception unit and at a distance from the reception unit to receive the reflective wave of the sensing wave from the detected object in the detection area. A horizontal direction detecting unit is configured to detect a phase difference between a signal of the reflective wave received by the reception unit and a signal of the reflective wave, received by the horizontal direction reception unit and configured to detect a horizontal direction, in which the detected object exists, the horizontal direction being at an inclination angle relative to a detection reference direction. A vertical direction detecting unit is configured to calculate a vertical direction, in which the near-road-surface obstacle exists, based on the linear distance detected by the linear distance arithmetic unit and the height of the transmission and reception device. In the present structure, when the horizontal direction detecting unit detects the horizontal direction, in which the detected object exists, and when the object determination unit determines the detected object to be the near-road-surface obstacle, the horizontal direction correction unit corrects the horizontal direction based on a calculation result of the vertical direction calculated by the vertical direction detecting unit. Thus, an error in the existence horizontal direction due to a difference between the height of the reception unit and the height of the near-road-surface obstacle can be corrected. Thereby, the horizontal direction can be accurately obtained. Further, the vertical direction can be detected only by the horizontal direction reception unit without a reception unit for detecting a perpendicular detection. Therefore, a three-dimensional position of an obstacle can be detected with a simple structure.

In addition to the transmission unit and the reception unit, the transmission and reception device further includes a low position reception unit located at a position lower than the transmission and reception device in the movable object and directed toward an outside. The low position reception unit is configured to receive the reflective wave of the sensing wave from the detected object in a detection area. A distance arithmetic unit is configured to detect a time period between a time point of transmission of the sensing wave and a time point, at which the low position reception unit receives the reflective wave from the detected object, and configured to calculate a distance from the detected object based on the detected time period and a speed of the sensing wave. A unit detects the distance calculated by the distance calculation unit as a distance from the detected object when the object determination unit determines the detected object to be the near-road-surface obstacle. The reception unit may be incapable of receiving the reflective wave from the near-road-surface obstacle after recognizing the near-road-surface obstacle on reception of the reflective wave. On the contrary, in the present structure, the low position reception unit is capable of receiving the reflective wave, instead of the reception unit. Thus, the distance from the near-road-surface obstacle approaching closer with movement of the movable object can be detected.

An information unit is configured to perform an information operation differently according to the kind of the detected object determined by the object determination unit. Therefore, when a user drives the movable object, the user can be properly notified of information whether the detected object, which exists in a direction of movement of the movable object, is the near-road-surface obstacle or an other obstacle according to the information operation performed by the information unit. Thus, information required for a driving operation can be suitably notified.

The information unit is configured to output information sound differently according to the kind of the detected object. Therefore, a user can recognize whether the detected object, which exists in the direction of movement of the movable object, is the near-road-surface obstacle or an other obstacle by hearing the information sound outputted from the information unit.

An indication portion is configured to perform indication differently according to the kind of the detected object. Therefore, a user can easily and quickly determine whether the detected object is a near-road-surface obstacle or an other obstacle by visually recognizing the indication portion.

The above structures of the embodiments can be combined as appropriate. The above processings such as calculations and determinations are not limited being executed by the ECU 2. The control unit may have various structures including the ECU 2 shown as an example.

The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. An obstacle detection apparatus comprising:
    a transmission and reception device located at a predetermined height on a movable object and directed toward an outside, the transmission and reception device including
        i) a transmission unit, being a single element, configured to repeatedly transmit sensing waves at a predetermined interval and
        ii) a reception unit, being a single element, configured to receive reflective waves of the sensing waves from the detected object in a detection area;
    a peak value detecting unit responsive to the reception unit, and configured to detect peak values of the reflective waves received by the reception unit and configured to store the detected peak values;
    a difference arithmetic unit responsive to the detected peak values received from the peak value detecting unit, and configured to calculate a difference in the peak values detected by the peak value detecting unit with movement of the movable object closer to the detected object; and
    an object determination unit responsive to the difference received from the difference arithmetic unit, and configured to
        i) determine a kind of the detected object to be a near-road-surface obstacle, which exists at a position close to a road surface, when the difference in the peak values calculated by the difference arithmetic unit is a negative value, and
        ii) determine the kind of the detected object to be an other obstacle, which exists at a position higher than the position close to the road surface, when the difference in the peak values calculated by the difference arithmetic unit is a positive value.

2. The obstacle detection apparatus according to claim 1, wherein the object determination unit is configured to determine the kind of the detected object to be the near-road-surface obstacle at a position where the difference becomes a negative value due to that the detected object comes to an outside of the detection area with movement of the movable object closer to the detected object.

3. The obstacle detection apparatus according to claim 1, wherein the transmission and reception device is located at a position higher than a bumper of the movable object.

4. The obstacle detection apparatus according to claim 1, further comprising:
    a linear distance arithmetic unit responsive to the transmission and reception device, and configured to detect a time period between a time point, at which the transmission unit transmits the sensing wave, and a time point, at which the reception unit receives the reflective waves from the detected object, and configured to calculate a linear distance from the detected object based on the detected time period and a speed of the sensing wave; and
    a horizontal distance arithmetic unit responsive to the linear distance arithmetic unit, and configured to calculate a horizontal distance from the near-road-surface obstacle based on the linear distance detected by the linear distance arithmetic unit and the height of the transmission and reception device when the object determination unit determines the detected object to be the near-road-surface obstacle.

5. The obstacle detection apparatus according to claim 4, further comprising:
    a horizontal direction reception unit located at a height substantially equivalent to the height of the reception unit and at a distance from the reception unit to receive reflective waves of the sensing waves from the detected object in the detection area;
    a horizontal direction detecting unit responsive to the horizontal direction reception unit, and configured to detect a phase difference between a signal of one of the reflective waves received by the reception unit and a signal of corresponding one of the reflective waves received by the horizontal direction reception unit and configured to detect a horizontal direction, in which the detected object exists, the horizontal direction being at an inclination angle relative to a detection reference direction; and
    a vertical direction detecting unit responsive to the linear distance arithmetic unit, and configured to calculate a vertical direction, in which the near-road-surface obstacle exists, based on the linear distance detected by the linear distance arithmetic unit and the height of the transmission and reception device,
    wherein the horizontal direction detecting unit includes a horizontal direction correction unit configured to correct the horizontal direction based on the vertical direction calculated by the vertical direction detecting unit when the object determination unit determines the detected object to be the near-road-surface obstacle on detection of the horizontal direction.

6. The obstacle detection apparatus according to claim 1; wherein the transmission and reception device further includes:
  i) a low position reception unit located at a position lower than the transmission and reception device in the movable object and directed toward an outside, the low position reception unit being configured to receive reflective waves of the sensing waves from the detected object in the detection area; and
  ii) a distance arithmetic unit responsive to the low position reception unit, and configured to detect a time period between a time point of transmission of the sensing wave and a time point, at which the low position reception unit receives the reflective waves from the detected object, and configured to calculate a distance from the detected object based on the detected time period and a speed of the sensing wave,
  wherein the transmission and reception device employs the distance calculated by the distance calculation unit as a distance from the detected object when the object determination unit determines the detected object to be the near-road-surface obstacle.

7. The obstacle detection apparatus according to claim 1, further comprising:
  an information unit responsive to the object determination unit, and configured to perform an information operation differently according to the kind of the detected object determined by the object determination unit.

8. The obstacle detection apparatus according to claim 7, wherein the information unit is configured to output information sound differently according to the kind of the detected object.

9. The obstacle detection apparatus according to claim 7, wherein the information unit includes an indication portion configured to perform indication differently according to the kind of the detected object.

10. The obstacle detection apparatus according to claim 1, wherein the transmission unit of the transmission and reception device is configured to transmit an ultrasonic wave signal as the sensing wave.

11. The obstacle detection apparatus according to claim 1, wherein the difference is a value between one of the peak values and an other of the peak values, which is subsequent to the one of the peak values.

12. A method for detecting an obstacle, the method comprising:
  causing a single-element transmission unit that is included in a transmission and reception device to repeatedly transmit sensing waves at a predetermined interval from a predetermined height on a movable object toward an outside of the movable object;
  causing a single-element receiving unit that is included in the transmission and reception device to receive reflective waves of the sensing waves at the predetermined height on the movable object from a detected object in a detection area;
  detecting peak values of the received reflective waves;
  storing the detected peak values;
  calculating a difference in the stored detected peak values with movement of the movable object closer to the detected object;
  determining a kind of the detected object to be a near-road-surface obstacle, which exists at a position close to a road surface, when the calculated difference in the peak values is a negative value; and
  determining the kind of the detected object to be an other obstacle, which exists at a position higher than the position close to the road surface, when the calculated difference in the peak values is a positive value.

13. The method according to claim 12, wherein the difference is a value between one of the peak values and an other of the peak values, which is subsequent to the one of the peak values.

14. The obstacle detection apparatus according to claim 10, wherein the near-road-surface obstacle and the other obstacle are fixed to the road surface.

15. The obstacle detection apparatus according to claim 14, wherein the object determination unit is further configured to determine whether the kind of the detected object to be the near-road-surface obstacle or the other obstacle according to a height of the detected object.

16. The method according to claim 12, further comprising:
  determining whether the kind of the detected object to be the near-road-surface obstacle or the other obstacle according to a height of the detected object, wherein
  the near-road-surface obstacle and the other obstacle are fixed to the road surface, and
  the transmission unit is configured to transmit an ultrasonic wave signal as the sensing wave.

17. An obstacle detection apparatus comprising:
  a transmission and reception device located at a predetermined height on a movable object and directed toward an outside of the movable object, the transmission and reception device including
    i) a single-element transmission unit configured to repeatedly transmit sensing waves at a predetermined interval, and
    ii) a single-element reception unit configured to receive reflected sensing waves from a detected object in a detection area;
  a peak value detecting unit configured to detect peak values of the reflected waves received by the reception unit as numeric values, and configured to store the detected peak values;
  a difference arithmetic unit configured to calculate a difference in the detected peak values as the movable object moves closer to the detected object; and
  an object determination unit configured to
    i) determine that the detected object is a near-road-surface obstacle, which exists at a position close to a road surface, when the difference in the detected peak values is negative, and
    ii) determine that the detected object is an above-road-surface obstacle, which exists at a position higher than the position close to the road surface, when the difference in the peak values is positive.

18. The obstacle detection apparatus according to claim 17, wherein the difference in the detected peak values is determined to be a difference between a first peak value associated with a first reflected sensing wave and a second peak value associated with a second reflected sensing wave that is received subsequent to the first reflected sensing wave.

19. The obstacle detection apparatus according to claim 17, wherein the transmission unit of the transmission and reception device is configured to transmit an ultrasonic wave signal as the sensing wave.

20. The obstacle detection apparatus according to claim 17, wherein the near-road-surface obstacle and the above-road-surface obstacle are both fixed to the road surface.

* * * * *